US008152217B2

(12) United States Patent  
Tanoi

(10) Patent No.: US 8,152,217 B2  
(45) Date of Patent: Apr. 10, 2012

(54) ROOF OPERATING DEVICE

(75) Inventor: Tsutomu Tanoi, Toyoake (JP)

(73) Assignee: Aisin Seiki Kabushiki Kaisha, Kariya-shi, Aichi-ken (JP)

(*) Notice: Subject to any disclaimer, the term of this patent is extended or adjusted under 35 U.S.C. 154(b) by 139 days.

(21) Appl. No.: 12/585,742

(22) Filed: Sep. 23, 2009

(65) Prior Publication Data  
US 2010/0072775 A1  Mar. 25, 2010

(30) Foreign Application Priority Data  
Sep. 25, 2008  (JP) .................................. 2008-246399

(51) Int. Cl.  
B60J 7/00  (2006.01)

(52) U.S. Cl. .................................................. 296/107.17

(58) Field of Classification Search ............. 296/107.17, 296/107.08, 76; 292/101, 216; 224/315  
See application file for complete search history.

(56) References Cited

U.S. PATENT DOCUMENTS

| | | | | |
|---|---|---|---|---|
| 2,994,550 A | * | 8/1961 | White ........................ 292/341.16 |
| 3,081,078 A | * | 3/1963 | Lohr ................................. 49/139 |
| 4,624,491 A | * | 11/1986 | Vincent ......................... 292/201 |
| 4,707,007 A | * | 11/1987 | Inoh .......................... 292/341.16 |
| 4,763,936 A | * | 8/1988 | Rogakos et al. ............... 292/201 |
| 4,948,184 A | * | 8/1990 | Weyerstall et al. ............ 292/216 |
| 4,974,885 A | * | 12/1990 | Yokoyama ..................... 292/201 |
| 4,982,984 A | * | 1/1991 | Yokota et al. .................. 292/201 |
| 5,118,146 A | * | 6/1992 | Watanuki ....................... 292/216 |
| 5,158,330 A | * | 10/1992 | Weyerstall et al. ........... 292/144 |
| 5,222,775 A | * | 6/1993 | Kato .............................. 292/201 |
| 5,232,253 A | * | 8/1993 | Tamiya ......................... 292/201 |
| 5,273,325 A | * | 12/1993 | Zimmermann ............... 292/216 |
| 5,382,763 A | * | 1/1995 | Martus et al. .............. 200/61.62 |
| 5,423,582 A | * | 6/1995 | Kleefeldt ....................... 292/201 |
| 5,551,743 A | * | 9/1996 | Klein et al. ...................... 296/76 |
| 5,639,130 A | | 6/1997 | Rogers, Jr. et al. |

(Continued)

FOREIGN PATENT DOCUMENTS  
DE   199 60 012   2/2001

(Continued)

OTHER PUBLICATIONS  
Extended European Search Report for EP Appl. No. 09171090.5 dated Nov. 2, 2011.

Primary Examiner — Kiran B Patel  
(74) Attorney, Agent, or Firm — Finnegan, Henderson, Farabow, Garrett & Dunner, LLP

(57) ABSTRACT

A roof operating device includes a roof member operated so as to be extended from and stored in vehicle body, a lid operated to be opened and closed when the roof member is operated, an operation switch, actuators driving the roof member and the lid, a first and second closer mechanisms provided at first and second portions and operated for moving the lid so as to be in a fully closed state, and each of the first and second closer mechanisms including a striker, a latch and a half latched state detection portion for detecting a half latched state between the latch and the striker, wherein after the half latched state detection portions detect the half latched state, and the operation switch is continuously operated, the first and second closer mechanisms are synchronously operated in order to move the lid so as to be in a fully closed state.

8 Claims, 4 Drawing Sheets

U.S. PATENT DOCUMENTS

| | | | | |
|---|---|---|---|---|
| 5,769,468 | A * | 6/1998 | Armbruster | 292/201 |
| 5,775,766 | A * | 7/1998 | Schaible et al. | 296/107.09 |
| 5,785,364 | A * | 7/1998 | Kleefeldt et al. | 292/201 |
| 5,868,444 | A * | 2/1999 | Brackmann et al. | 292/201 |
| 5,934,717 | A * | 8/1999 | Wirths et al. | 292/201 |
| 5,938,251 | A * | 8/1999 | Watanabe | 292/201 |
| 5,938,253 | A * | 8/1999 | Szablewski et al. | 292/216 |
| 5,979,951 | A * | 11/1999 | Shimura | 292/216 |
| 6,000,257 | A * | 12/1999 | Thomas | 70/279.1 |
| 6,003,910 | A * | 12/1999 | Dupont et al. | 292/201 |
| 6,024,403 | A * | 2/2000 | Ritter et al. | 296/117 |
| 6,059,327 | A * | 5/2000 | Yoshikuwa | 292/216 |
| 6,076,868 | A * | 6/2000 | Roger et al. | 292/201 |
| 6,092,335 | A | 7/2000 | Queveau | |
| 6,109,671 | A * | 8/2000 | Roncin et al. | 292/216 |
| 6,193,300 | B1 * | 2/2001 | Nakatomi et al. | 296/107.08 |
| 6,382,687 | B1 * | 5/2002 | Gruhn | 292/201 |
| 6,422,617 | B1 | 7/2002 | Fukumoto et al. | |
| 6,435,573 | B1 * | 8/2002 | Szablewski | 292/201 |
| 6,519,986 | B2 * | 2/2003 | Wicker | 70/237 |
| 6,523,376 | B2 * | 2/2003 | Baukholt et al. | 70/256 |
| 6,572,157 | B2 * | 6/2003 | Kaute et al. | 292/201 |
| 6,637,783 | B2 * | 10/2003 | Takamura | 292/201 |
| 6,736,445 | B2 * | 5/2004 | Obendiek | 296/107.17 |
| 6,767,047 | B2 * | 7/2004 | Eichhorst et al. | 296/128 |
| 6,773,043 | B2 * | 8/2004 | Taga | 292/341.16 |
| 6,837,535 | B2 * | 1/2005 | Plesternings | 296/121 |
| 7,063,371 | B2 * | 6/2006 | Willard | 296/107.17 |
| 7,140,666 | B2 * | 11/2006 | Wulf et al. | 296/124 |
| 7,152,890 | B2 * | 12/2006 | Torkowski et al. | 292/216 |
| 7,198,318 | B2 * | 4/2007 | Dilluvio | 296/107.08 |
| 7,261,339 | B2 * | 8/2007 | Kiehl | 292/216 |
| 7,341,290 | B2 * | 3/2008 | Torka et al. | 292/201 |
| 7,380,844 | B2 * | 6/2008 | Berghahn et al. | 292/201 |
| 7,434,853 | B2 * | 10/2008 | Yamamoto et al. | 292/216 |
| 7,475,922 | B2 * | 1/2009 | Ottino et al. | 292/216 |
| 7,478,846 | B2 * | 1/2009 | Yoshikuwa et al. | 292/216 |
| 7,621,571 | B2 * | 11/2009 | Umino | 292/216 |
| 7,770,945 | B2 * | 8/2010 | Umino | 292/201 |
| 2001/0042998 | A1 | 11/2001 | Kaute et al. | |
| 2002/0109372 | A1 | 8/2002 | Weissmueller | |
| 2002/0167175 | A1 * | 11/2002 | Weyerstall et al. | 292/196 |
| 2003/0052488 | A1 | 3/2003 | Heller et al. | |
| 2004/0227357 | A1 | 11/2004 | Ishihara et al. | |
| 2006/0131920 | A1 | 6/2006 | Queveau et al. | |
| 2008/0203770 | A1 | 8/2008 | Selle | |

FOREIGN PATENT DOCUMENTS

| | | |
|---|---|---|
| DE | 100 38 530 | 2/2002 |
| DE | 101 37 800 | 3/2003 |
| DE | 103 32 636 | 5/2005 |
| EP | 0 745 746 | 12/1996 |
| EP | 1 076 141 | 2/2001 |
| EP | 1 452 361 | 9/2004 |
| FR | 2 846 604 | 5/2004 |
| FR | 2 856 966 | 1/2005 |
| JP | 2002-21396 | 1/2002 |
| JP | 2003-106045 | 4/2003 |
| JP | 2003-220833 | 8/2003 |
| WO | WO 2006/066526 | 6/2006 |

* cited by examiner

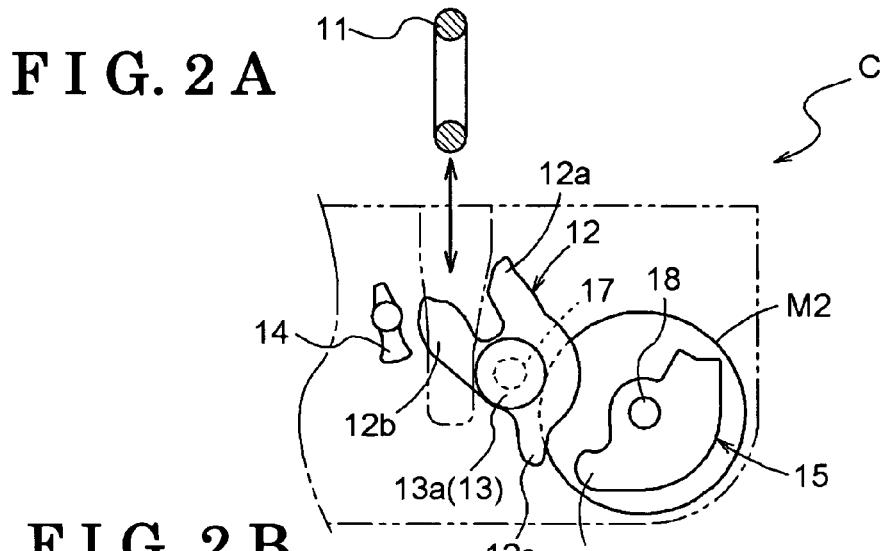
FIG. 2A
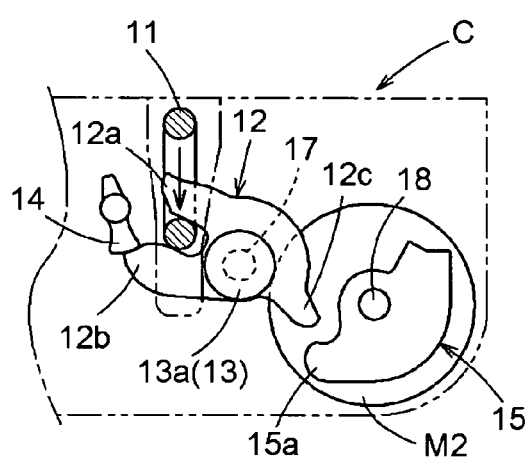
FIG. 2B
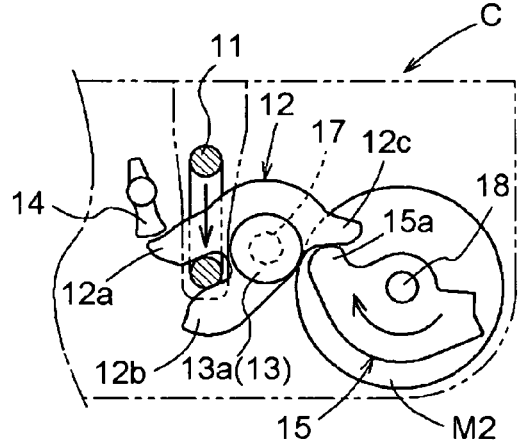
FIG. 2C
FIG. 3
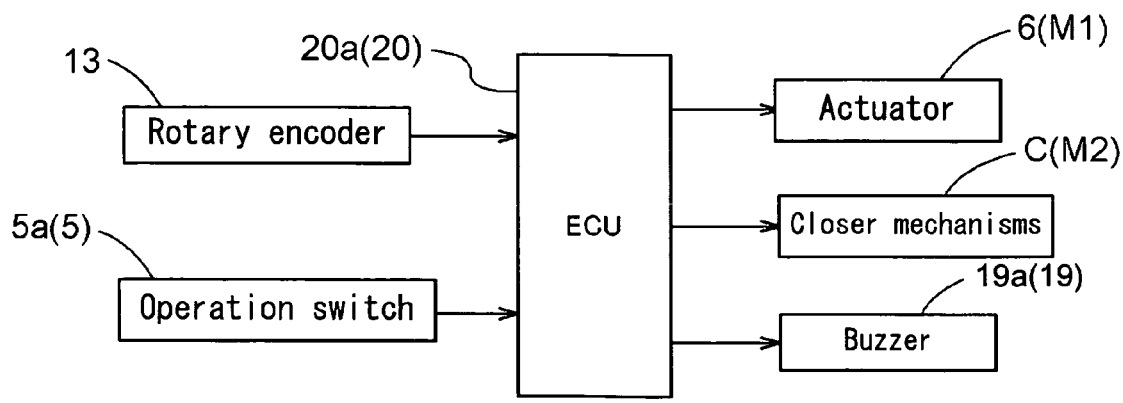

ROOF OPERATING DEVICE

CROSS REFERENCE TO RELATED APPLICATIONS

This application is based on and claims priority under 35 U.S.C. §119 to Japanese Patent Application 2008-246399, filed on Sep. 25, 2008, the entire content of which is incorporated herein by reference.

TECHNICAL FIELD

This disclosure relates to a roof operating device where a lid is pulled toward a vehicle body while a roof member is stored in a compartment of the vehicle body, in order to displace the trunk lid being in a slightly opened state to a fully closed state.

BACKGROUND

An operating device of the roof disclosed in JP200221396A includes a closer provided in the vicinity of a central portion of a lid such as a back door and a trunk lid in order to surely fit (e.g., fully close) a lid to an opening of a vehicle body (e.g. an opening of a trunk). When the lid is automatically operated so as to close the opening of the trunk, the lid needs to be operated to be in a fully closed state against an elastic force of a weather strip provided at the opening of the trunk.

In order to operate the lid so as to surely fit the opening of the trunk against the elastic force of the weather strip, the closer needs to be driven by a large motor, that is a closer mechanism including the closer and the motor may be increased in size. When such large closer mechanism is provided at the trunk, and a roof member whose structure is relatively large is stored in/extended from the trunk, the roof member may interfere with the closer mechanism while the roof member is operated. This interference may be prevented if the closer mechanism is divided into two closer mechanisms, where one closer mechanism is provided at the right of the trunk in a vehicle width direction (a right closer mechanism), and the other closer mechanism is provided at the left of the trunk in the vehicle width direction (a left closer mechanism). In this configuration, while the lid is operated so as to close the opening of the trunk, if the lid is postured so as not to be horizontal (tilting in a horizontal direction), a timing of starting the right closer mechanism may differ from a timing of starting the left closer mechanism, as a result, the trunk lid may be strained, and a load may be applied to the trunk lid, accordingly an appearance when the trunk lid is operated may be deteriorated.

A need thus exists to provide a roof operating device which is not susceptible to the drawback mentioned above.

SUMMARY

According to an aspect of this disclosure, the roof operating device includes a roof member operated to be extended so as to cover a top portion of a vehicle body and operated to be stored inside the vehicle body, a lid operated to be opened when the roof member is operated so as to be stored, the lid operated to be closed when the roof member is operated so as to be extended, an operation switch provided at the vehicle body and operated in order to operate the roof member and the lid, actuators driving the roof member and the lid, a first closer mechanism provided at a first portion so as to connect the vehicle body and the lid for moving the lid so as to be in a fully closed state, a second closer mechanism provided at a second portion so as to connect the vehicle body and the lid for moving the lid so as to be in a fully closed state and each of the first and second closer mechanisms including a striker provided at one of the vehicle body and the lid, a latch provided at the other of the vehicle body and the lid and half latched state detection portions each of which detects a half latched state between the latch being actuated by the actuator and the striker, wherein after the half latched state detection portions provided the first and second closer mechanisms detect the half latched state, and the operation switch is continuously operated, the first and second closer mechanisms are synchronously operated in order to move the lid so as to be in a fully closed state.

BRIEF DESCRIPTION OF THE DRAWINGS

The foregoing and additional features and characteristics of the disclosure will become more apparent from the following detailed description considered with the reference to the accompanying drawings, wherein:

FIG. 2A illustrates a diagram indicating a state of a closer mechanism;

FIG. 2B illustrates a diagram indicating a state of a closer mechanism;

FIG. 2C illustrates a diagram indicating a state of a closer mechanism;

FIG. 3 illustrates a block diagram indicating relations between a controlling portion and switches, an actuator and mechanisms;

DETAILED DESCRIPTION

First Embodiment

Figure 1A:
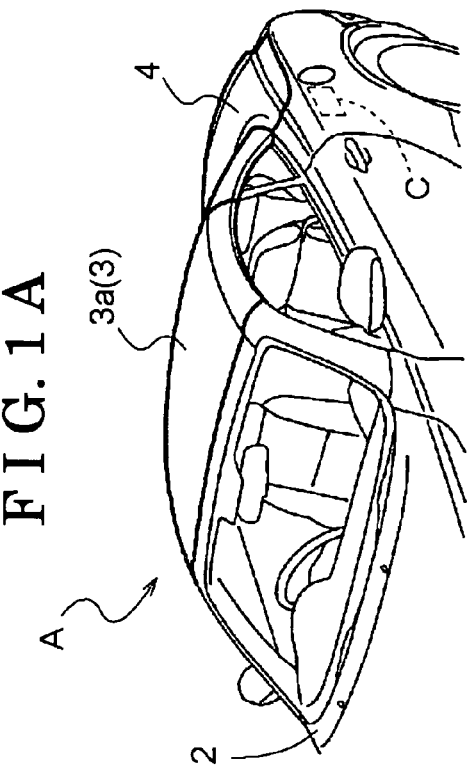
FIG. 1A illustrates a diagram indicating a extending/storing state of a roof member.

A vehicle A to which a roof operating device 1 is mounted will be explained with reference to attached drawings.

(Entire Configuration of Vehicle)

The vehicle A includes a power-operated hardtop for operating a roof member so as to close/open a roof of the vehicle A. As illustrated in FIGS. 1A through 1D, a vehicle body 2 of the vehicle A includes a movable roof 3a, a trunk lid 4 (e.g., a lid) and an open/close button 5a. The movable roof 3a serving as a roof member is operated so as to be in an extended state for covering a top portion of the vehicle body 2 and in a stored state being stored in a storage space (e.g., a trunk). The trunk lid 4 is operated so as to open an opening of the trunk when the movable roof 3a is extended from the trunk, and the trunk lid is operated so as to close the opening of the trunk when the movable roof 3a is stored in the trunk. The open/close button 5a serving as an operation switch 5 is arranged on an instrument panel or a room mirror and is operated in order to actuate the movable roof 3a and the trunk lid 4 by a plurality of electric motors M1 (a roof motor, a luggage motor and the like) serving as an actuator 6 (e.g., a luggage actuator).

Figure 1B:
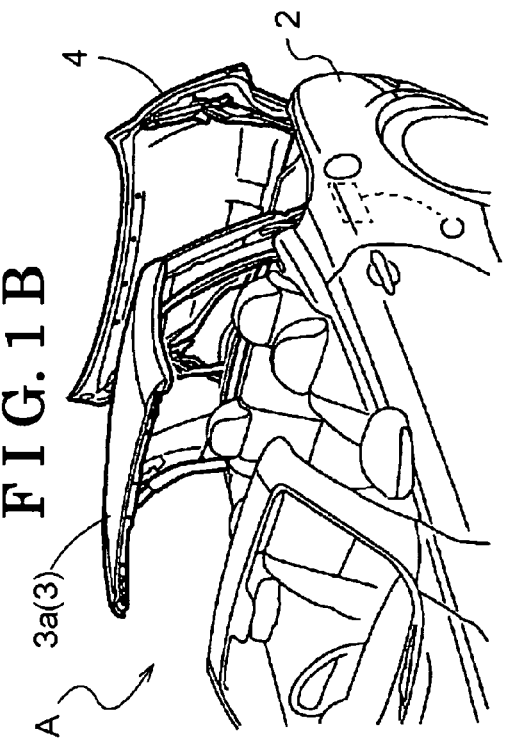
FIG. 1B illustrates a diagram indicating a extending/storing state of the roof member.
Figure 1D:
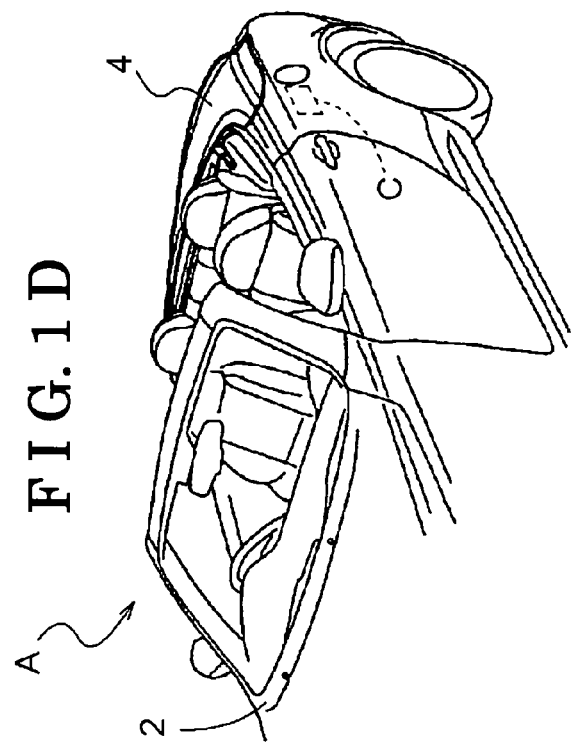
FIG. 1D illustrates a diagram indicating a extending/storing state of the roof member.
Figure 1C:
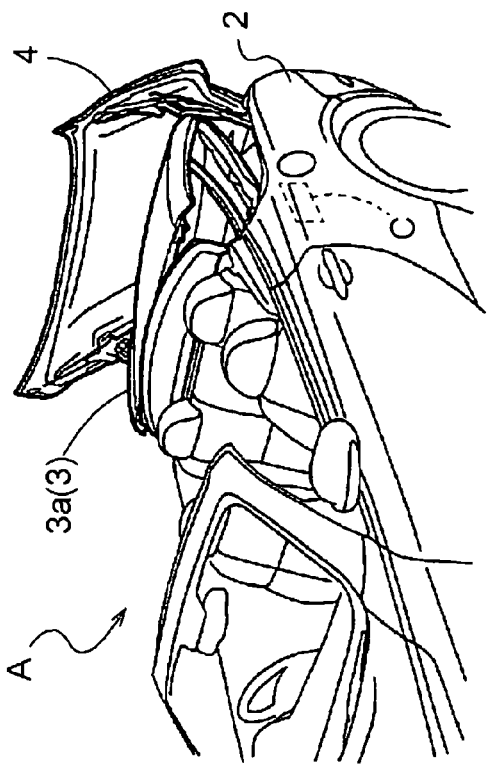
FIG. 1C illustrates a diagram indicating a extending/storing state of the roof member.

When the open/close button 5a is pressed by an operator in order to open the roof, the trunk lid 4 is displaced so as to open the trunk, and the movable roof 3a is operated so as to be stored in the trunk (see FIGS. 1A and 1B). After the movable roof 3a is stored in the trunk, the trunk lid 4 is consequently displaced so as to close the trunk (FIGS. 1C and 1D). This storing operation is continuously executed while the open/close button 5a is kept being pressed. Accordingly, by keeping the open/closed button 5a to be pressed by an operator, the closing operations of the movable roof 3a and the trunk lid 4 may be continuously executed. The storing operation of the movable roof 3a and the closing operation of the trunk lid 4 may be interrupted when the operator stops pressing the open/close button 5a.

A rubber made-weather strip is attached to the vehicle body 2, especially the opening of the trunk, in order to secure a contact between the vehicle body 2 and the trunk lid 4 when the trunk lid 4 is closed, so that water may not enter the trunk. Because the weather strip may generate an elastic force when the trunk lid 4 contacts thereto, the trunk lid 4 may be in a slightly opened state because of the elastic force. In order to fully close the trunk lid 4 (a fully closed state), the trunk lid 4 being in the slightly opened state is pulled toward the vehicle body 2 so as to be in the fully closed state by means of a closer mechanism C. In this embodiment, two closer mechanisms C are mounted to the vehicle body 2 so as to connect the vehicle body 2 and the trunk lid 4, one closer mechanism C (e.g., a first closer mechanism) is provided at the right side (e.g., a first portion) of the vehicle body 2, and the other of the closer mechanisms C (e.g., a second closer mechanism) is provided at the left side (e.g., a second portion) of the vehicle body 2, so that the movable roof 3a may not interfere with the closer mechanisms C during its storing operation.

(Configuration of Closer Mechanism)

FIG. 2 illustrates one of the closer mechanisms C. The closer mechanism C includes a striker 11 provided at the trunk lid 4, a latch 12 provided at the vehicle body 2 and a rotary encoder 13a serving as a half latched state detection switch 13 (e.g., a half latched state detection portion). When the actuator 6 is driven in order to close the trunk lid 4, and the latch 12 is incompletely engaged with the striker 11 so as to be in a half latched state (the trunk lid 4 is slightly opened), the rotary encoder 13a detects the half latched state between the striker 11 and the latch 12. The latch 12 and the rotary encoder 13a are provided at the vehicle body 2. Moreover, a pawl 14, a latch lever 15 and the electric motor M2 (closer) and the like are provided at the vehicle body 2. The striker 11 is formed in a U-shape and is provided at the trunk lid 4. The latch 12 is formed so as to include a first arm portion 12a, a second arm portion 12b and a latch protruding portion 12c and is arranged so as to be rotatably relative to a shaft 17. The rotary encoder 13a is attached to the shaft 17 in order to detect a rotational position of the latch 12, and on the basis of the detected rotational position, the half latched state between the latch 12 and the striker 11 may be detected by the rotary encoder 13a. The pawl 14 is formed in a thin shape. The latch lever 15 includes a lever protruding portion 15a and is arranged so as to be rotatably relative to a shaft 18. The electric motor M2 is attached to the shaft 18.

When the trunk lid 4 is in an opened sate, the striker 11 and the latch 12 are in an unlatch state, and the latch 12 is postured so as to open in an upper left direction (see FIG. 2A). When the trunk lid 4 is in the slightly opened state, the trunk lid 14 is operated so that the striker 11 enters a space regulated between the first arm portion 12a and a second arm portion 12b, accordingly the latch 12 being in the unlatched position is rotated so as to be in a half latched position. In the half latched position, the latch 12 postures so as to open in an approximately horizontal direction (see FIG. 2B). The state where the latch 12 is in the half latched position corresponds to a half latched state of the closer mechanism C (e.g., a half latched state between the striker 11 and the latch 12). At this point, the pawl 14 contacts the second arm portion 12b in order to regulate the latch 12 so as not to rotate from the half latched position toward the fully opened position.

When the rotary encoder 13a detects that the half latched state between the latch 12 and the striker 11 is established, the electric motor M2 is actuated in order to rotate the latch lever 15 in a clockwise direction. In accordance with the rotation of the latch lever 15, the lever protruding portion 15a engages the latch protruding portion 12c in order to rotate the latch 12 being in the half latched position (opening in the horizontal position) toward a fully latched position (opening in an lower left direction), as illustrated in FIG. 2C. This state corresponds to the fully latched state of the closer mechanism C. Then, the striker 11 is moved toward the vehicle body 2 by means of the first and second arm portions 12a and 12b, accordingly, the trunk lid 4 is operated so as to be pulled toward the vehicle body 2, as a result, the trunk lid 4 being in the slightly opened state is displaced so as to be in the fully closed state. At this point, the pawl 14 engages the first arm portion 12a in order to maintain the latch 12 at the fully latched position.

A control of the roof operating device will be explained. As illustrated in FIG. 3, an ECU 20a serving as a controlling mechanism 20 is provided in order to control the actuations of the electric motors M1 and M2 and a buzzer 19a serving as an alarming mechanism 19 on the basis of the detection by the half latched state detection switch 13 and the input information of the operation switch 5. The ECU 20a controls two closer mechanisms C to be synchronously operated so as to pull the trunk lid 4 toward the vehicle body, when the half latched state detection switch 13 detects that both of the closer mechanisms C are in the half latched state, and the operation switch 5 is continuously pressed. Because of this configuration, even when the trunk lid 4 is postured so as not to be horizontal, each of the closer mechanism C may be actuated at the same time. Thus, a load may not be applied to the trunk lid 4, and behavior when the trunk lid 4 is operated may be improved. It is preferable if the two closer mechanisms C are simultaneously actuated.

Figure 4:
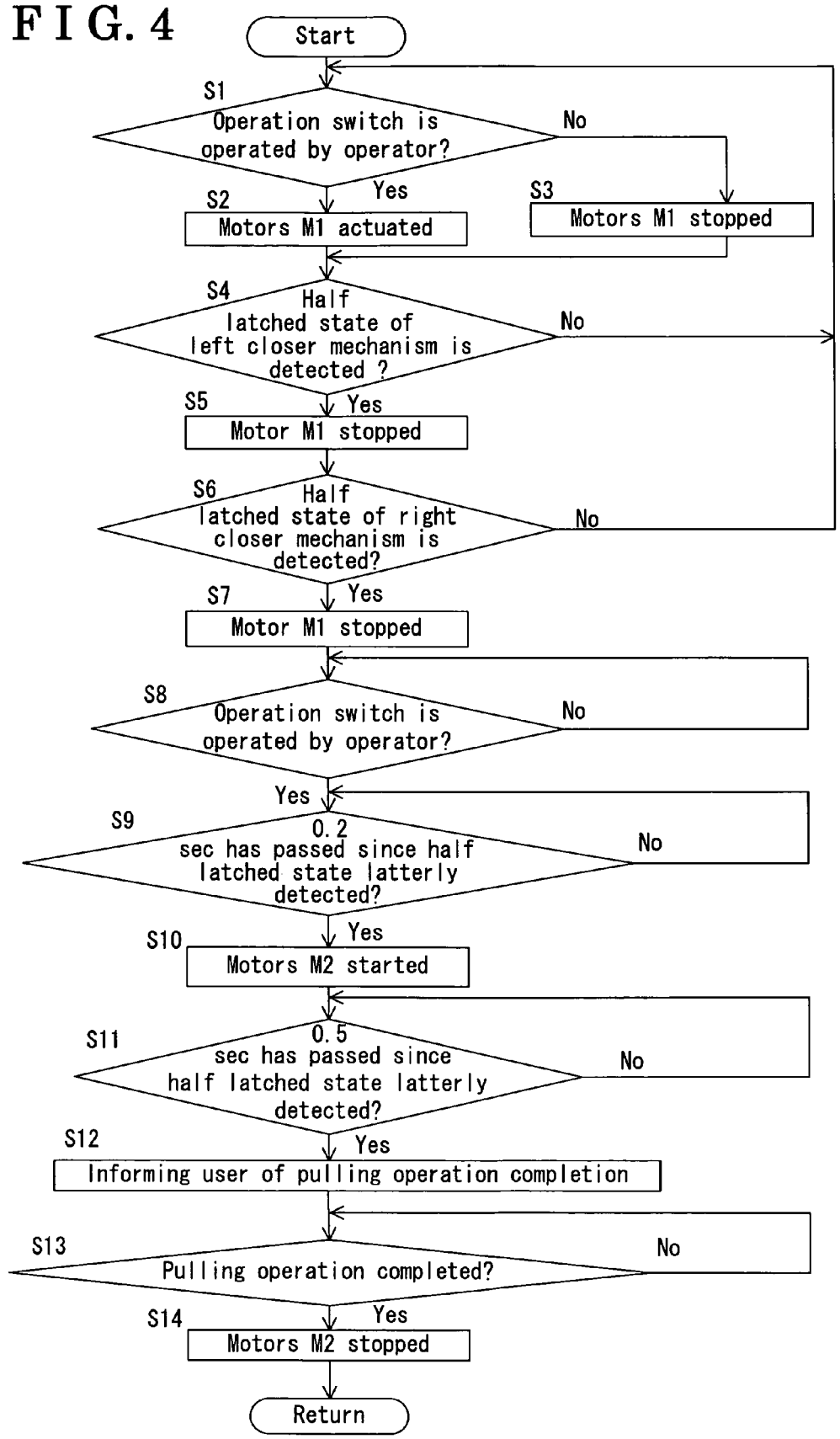
FIG. 4 illustrates a flowchart indicating a control of a first embodiment.

A control of the roof operating device in the first embodiment will be explained in accordance with a flowchart illustrated in FIG. 4. When the operator presses the open/close button 5a in order to close the movable roof 3a, the electric motors M1 start and keep driving in order to operate the trunk lid 4 so as to be closed during a period where the operator keeps pressing the open/close button 5a. When one of the rotary encoders 13 provided at one of the closer mechanisms C (e.g., the left closer mechanism C) detects the half latched state, the electric motor M1 for actuating the left closer mechanism C is stopped, and then when the other of the rotary encoders 13 provided at the other of the closer mechanisms C (e.g., the right closer mechanism C) detects the half latched state, the electric motor M1 for actuating the right closer mechanism C is stopped, as a result, the closing operation of the trunk lid 4 is stopped. (S1 through S6). At this point, the trunk lid 4 may be postured so as to be horizontal. Then, when the user keeps pressing the open/close button 5a, after both of the two rotary encoders 13a detect the half latched state of the closer mechanisms C, respectively, and after 0.2 seconds have passed since the half latched state was latterly detected, the motor M2 provided at each of the closer mechanism C is simultaneously actuated in order to operate the trunk lid 4 so as to pull the trunk lid 4 in the vehicle body (S7 through S9). After 0.5 seconds have passed since the half latched state was latterly detected, the buzzer 19a generates an alarm for informing the user of a completion that the trunk lid 4 is pulled in the vehicle body (S10 and S11). After the both of the two rotary encoder 13s detect the fully latched state of the closer mechanism C, respectively, each of the motors M2 is stopped so as to stop the pulling operation of the trunk lid 4 (S12 and A13). Each of the motors M2 is stopped in view of that the each of the closer mechanisms C may be considered in the fully latched state when 0.5 seconds have passed since the half latched state was latterly detected.

Second Embodiment

The second embodiment has an approximately identical configuration to the first embodiment, but a different controlling process. Following explanations emphasize on the difference of the controlling process between the first and second embodiments.

The ECU 20a controls two closer mechanisms C to synchronously operate the trunk lid 4 so as to pull the trunk lid 4 in the vehicle body, when the half latched state detection switch 13 detects the half latched states of both of the closer mechanisms C, and the operation switch 5 is continuously pressed. The roof operating device in the second embodiment has an alarming mechanism 19 for informing the operator of the detection of the half latched states detected by the half latched state alarming mechanism 19 of both of the closer mechanisms C, while the operation switch 5 is continuously pressed.

Figure 5:
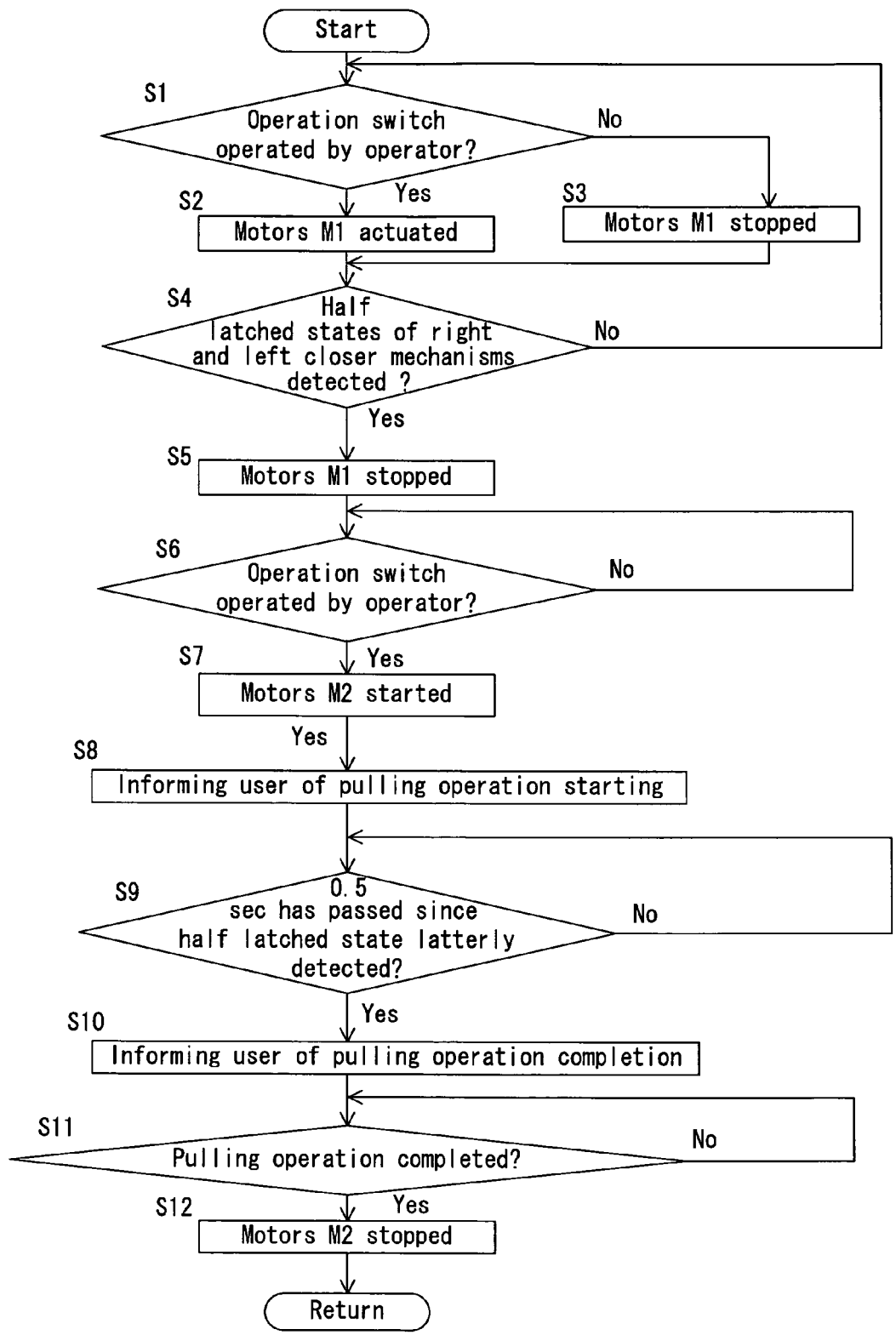
FIG. 5 illustrates a flowchart indicating a control of a second embodiment.

A control of the roof operating device in the second embodiment will be explained in accordance with a flowchart illustrated in FIG. 5. When the operator presses the open/close button 5a in order to close the movable roof 3a, the electric motors M1 start and keep driving in order to operate the trunk lid 4 so as to be closed during a period where the operator keeps pressing the open/close button 5a. When both of the rotary encoders 13 detect the half latched state, both of the electric motors M1 are stopped in order to stop the closing operation of the trunk lid 4. (S1 through S5). When the user keeps pressing the open/close button 5a, after both of the two rotary encoders 13a detect the half latched state of the closer mechanisms C, respectively, and immediately after the half latched state is latterly detected, the motor M2 provided at each of the closer mechanism C is simultaneously actuated in order to operate the trunk lid 4 so as to pull the trunk lid 4 in the vehicle body (S7 through S9). At this point, the buzzer 19a sounds an alarm for informing the user of that the half latched state is detected by each of the rotary encoders 13a while the user keeps pressing the open/close button 5a (S6 through S8). This alarm is generated when the half latched state is latterly detected by one of the rotary encoders 13a. Then, at the time when the pulling operation of the trunk lid 4 is completed, the buzzer 19a sounds an alarm for informing the user of the completion of the pulling operation of the trunk lid 4 (S9 and S10). After 0.5 seconds have passed since the half latched state was latterly detected, the buzzer 19a sounds an alarm for informing the user of a completion of the trunk lid 4 operation. The timing of the completion is identical to, for example the timing after 0.5 seconds have passed since the half latched state was lately detected. At this point, the closer mechanisms C are still actuated, and when each of the rotary encoders 13a detect the fully latched state of each of the closer mechanisms C, the motor M2 is stopped in order to stop the pulling operation of the trunk lid 4.

Modified Embodiments

In the embodiments, the half latched state detection switch 13 includes the rotary encoder 13, however; the configuration related to the half latched state detection switch 13 may not be limited to this and may be modified as follows. The half latched state detection switch 13 may be a limit switch, and a limit switch may be positioned so as to contact the latch 12 being in the half latched position in order to detect the half latched position, and another limit switch may be positioned so as to contact the latch 12 being in the fully latched position in order to detect the fully latched position. Further, the half latched state detection switch 13 may also be a proximity switch, that is any switching element changing its state when the latch 12 is in the half latched position In the embodiments, the alarming mechanism 19 includes the buzzer 19a, however; the configuration related to the alarming mechanism 19 may not be limited to this and may be modified as follows. The alarming mechanism 19 may be an indicator or an oscillator. In the embodiment, the buzzer 19a sounds an alarm for noticing the user of the start and completion of the pulling operation of the trunk lid 4, however, the buzzer 19a may sound an alarm only when the pulling operation of the trunk lid 4 is started, and the buzzer 19a may sound an alarm only when the pulling operation of the trunk lid 4 is completed. Further, because the alarm at the timing of the start of the pulling operation of the trunk lid 4 and the alarm at the timing of the completion of the pulling operation of the trunk lid 4 have a common sound, the user may be confused by the similarity. This confusion may be avoidable if the buzzer 19a sounds an alarm when the pulling operation of the trunk lid 4 is started, and the indicator or the like, which has a different informing manner from the buzzer, may inform the user of the completion of the pulling operation of the trunk lid 4.

In the embodiments, after 0.5 seconds have passed since the half latched state was latterly detected, the buzzer 19a generates an alarm for informing the user of a completion that the trunk lid 4 is pulled in the vehicle body, however; the configuration related to the alarming mechanism 19 may not be limited to this and may be modified as follows. The buzzer 19a may generate an alarm for informing the user of a completion that the trunk lid 4 is pulled in the vehicle body after both of the rotary encoders 13a detect the fully latched state.

In the second embodiment, after both of the two rotary encoders 13a detect the half latched state of the closer mechanisms C, respectively, and immediately after the half latched state is detected at a later stage, the motor M2 provided at each of the closer mechanisms C is simultaneously actuated in order to operate the trunk lid 4 so as to pull the trunk lid 4 in the vehicle body, however; the configuration may not be limited to this and may be modified as follows. After both of the two rotary encoders 13a detect the half latched state of the closer mechanisms C, respectively, and after a predetermined time period passed since the half latched state is latterly detected, the motor M2 provided at each of the closer mechanisms C is simultaneously actuated in order to operate the trunk lid 4 so as to pull the trunk lid 4 in the vehicle body.

According to the embodiment, the roof operating device includes the roof member operated to be extended so as to cover the top portion of the vehicle body and operated to be stored inside the vehicle body, the lid operated to be opened when the roof member is operated so as to be stored, the lid operated to be closed when the roof member is operated so as to be extended, an operation switch provided at the vehicle body and operated in order to operate the roof member and the lid, the actuators driving the roof member and the lid, one closer mechanism provided at the right so as to connect the vehicle body and the lid for moving the lid so as to be in a fully closed state, the other closer mechanism provided at the left so as to connect the vehicle body and the lid for moving the lid so as to be in a fully closed state, each of the first and second closer mechanisms including the striker provided at one of the vehicle body and the lid, the latch provided at the other of the vehicle body and the lid and the half latched state detection switch for detecting a half latched state between the latch being actuated by the actuator and the striker, wherein when the half latched state detection switch provided at the closer mechanisms detects the half latched state, and the operation switch is continuously operated, the closer mechanisms are synchronously operated in order to move the lid so as to be in a fully closed state. Specifically, the half latched state detection switch includes a rotary switch and is provided at a shaft of the latch in order to detect a rotational position of the latch, and more specifically, the half latched state detection switch includes a switching element changing a state thereof when the latch is in the half latched state.

Thus, when the operator operates the operation switch in order to close the roof member and the trunk lid, both of the half latched state detection switches of the closer mechanisms detect whether or not the latch and the striker are in the half latched state. At this point, when an operator keeps operating the operation switch, both of the closer mechanisms are synchronously operated in order to pull the trunk lid toward the vehicle body. In this configuration, because the trunk lid is pulled while the trunk lid is postured so as to be horizontal, a load such as stress may not be applied to the trunk lid, and each of the closer mechanisms may not be strained. The two closer mechanisms may be simultaneously actuated.

Because the operations of the two closer mechanisms are started at the same time, the trunk lid is operated while it is postured so as to be horizontal. Accordingly, behavior when the trunk lid is operated to be pulled may be improved.

Further, in this configuration, the closer mechanisms are operated in order to pull the trunk lid while the operator operates the operation switch. Specifically, when both of the half latched state detection switches detect the half latched states of both of the closer mechanisms, the trunk lid is in a slightly opened state. In other words, the trunk lid is operated to be in the slightly opened state while the operator keeps operating the operation switch. In this configuration, the trunk lid may not be operated inappropriately, for example, a situation where: a third person manually and forcibly closes the trunk lid; and then the half latched state detection switches detect the half latched states of the closer mechanisms; and finally the closer mechanisms are operated so as to pull the trunk lid toward the trunk, may be avoidable, as a result, a roof operating device by which safety is ensured may be provided.

In the embodiment, when the half latched state detection switches provided at the closer mechanisms detect the half latched state and the operation switch is continuously operated for a predetermined time period, the first and second closer mechanisms are synchronously operated in order move the lid so as to be in a fully closed state.

Thus, the half latched states of both of the closer mechanisms are detected by two half latched state detection switches, and the trunk lid is pulled by the closer mechanisms when the trunk lid is postured so as to be horizontal. Accordingly, behavior when the trunk lid is operated to be pulled may be improved, a load may not be applied to the trunk lid, and a roof operating device by which safety is ensured may be provided.

In the embodiment, the roof operating device further includes the alarming mechanism for informing the operator of the operation switch that the half latched state detection switch provided at the mechanisms detects the half latched state.

Thus, although a storing space for the roof member such as a trunk is provided at a rear portion of the vehicle body, and the operator may not visually recognize a closing or pulling operation, the operator may be informed by means of the alarming mechanism that the closing or pulling operation is continued. Accordingly, the alarming mechanism may assist the operator to operate the operation switch. Because the closer mechanism are operated so as to pull the trunk lid only when the operator kept operating the operation switch, the operator's intention to store the roof member in the trunk may be surely and objectively affirmed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof operating device comprising:
a roof member operated to be extended so as to cover a top portion of a vehicle body and operated to be stored inside the vehicle body;
a lid operated to be opened when the roof member is operated so as to be stored;
the lid operated to be closed when the roof member is operated so as to be extended;
an operation switch provided at the vehicle body and operated in order to operate the roof member and the lid;
actuators driving the roof member and the lid;
a first closer mechanism provided at a first position so as to connect the vehicle body and the lid and operated for moving the lid so as to be in a fully closed state;
a second closer mechanism provided at a second position so as to connect the vehicle body and the lid and operated for moving the lid so as to be in a fully closed state; and
each of the first and second closer mechanisms including a striker provided at one of the vehicle body and the lid, a latch provided at the other of the vehicle body and the lid, a half latched state detection portion for detecting a half latched state between the latch being actuated by the actuator and the striker, and a synchronous operating mechanism synchronously operating the first and second closer mechanisms, wherein after the half latched state detection portions provided at the first and second closer mechanisms detect the half latched state, and the operation switch is continuously operated, the synchronous operation mechanism operates the first and second closer mechanisms synchronously in order to move the lid to a fully closed state.

2. The roof operating device according to claim 1, wherein after the half latched state detection portions provided at the first and second closer mechanisms detect the half latched state and the operation switch is continuously operated for a predetermined time period, the first and second closer mechanisms are synchronously operated in order move the lid so as to be in a fully closed state.

3. The roof operating device according to claim 1 further including an alarming mechanism for informing an operator of the operation switch that the half latched state detection portion provided at the first and second closer mechanisms detects the half latched state.

4. The roof operating device according to claim 2 further including an alarming mechanism for informing an operator of the operation switch that the half latched state detection portion provided at the first and second closer mechanisms detects the half latched state.

5. The roof operating device according to claim 1, wherein the half latched state detection portion includes a switching element changing a state thereof when the latch is in the half latched state.

6. The roof operating device according to claim 2, wherein the half latched state detection portion includes a switching element changing a state thereof when the latch is in the half latched state.

7. The roof operating device according to claim 3, wherein the half latched state detection portion includes a switching element changing a state thereof when the latch is in the half latched state.

8. The roof operating device according to claim 4, wherein the half latched state detection portion includes a switching element changing a state thereof when the latch is in the half latched state.

\* \* \* \* \*